(12) United States Patent
Bryant et al.

(10) Patent No.: US 11,645,664 B2
(45) Date of Patent: May 9, 2023

(54) DYNAMIC WEB CONTENT INSERTION

(71) Applicant: The Travelers Indemnity Company, Hartford, CT (US)

(72) Inventors: Mathew S. Bryant, Colchester, CT (US); James J. Gauthier, Jr., Avon, CT (US); Keith W. Crumb, Jr., East Hampton, CT (US); Michael J. Ficorilli, New Britain, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 360 days.

(21) Appl. No.: 17/078,307

(22) Filed: Oct. 23, 2020

(65) Prior Publication Data
US 2022/0129926 A1    Apr. 28, 2022

(51) Int. Cl.
*G06Q 30/02*      (2012.01)
*G06Q 30/0203*    (2023.01)
(Continued)

(52) U.S. Cl.
CPC ....... *G06Q 30/0203* (2013.01); *G06F 16/958* (2019.01); *G06F 16/9535* (2019.01); *G06N 20/00* (2019.01); *G06Q 30/0218* (2013.01); *G06Q 30/0254* (2013.01); *G06Q 30/0282* (2013.01); *G06Q 30/0641* (2013.01); *H04L 63/0853* (2013.01)

(58) Field of Classification Search
CPC .............. G06Q 30/02; G06Q 30/0203; G06Q 30/0218; G06Q 30/0254; G06Q 30/0282; G06Q 30/0641; G06F 16/9535; G06F 16/95; G06F 16/953; G06F 16/958; G06N 20/00; H04L 63/08; H04L 63/0853
See application file for complete search history.

(56) References Cited

U.S. PATENT DOCUMENTS

2020/0004759 A1*   1/2020   Brebner .................... G06F 8/10
2020/0097547 A1*   3/2020   Williams ............... G06F 40/30
(Continued)

FOREIGN PATENT DOCUMENTS

WO     WO-2014029904 A1 *   2/2014  ......... G06F 16/9535

OTHER PUBLICATIONS

Du, X., Ge, S., Wang, N., & Yang, Z. (2020). Personalized product service scheme recommendation based on trust and cloud model. IEEE Access, 8, 82581-82591. (Year: 2020).*

*Primary Examiner* — William S Brockington, III
(74) *Attorney, Agent, or Firm* — Cantor Colburn LLP

(57) ABSTRACT

A system includes a network interface, a processing system, and a memory system. The memory system stores instructions that when executed by the processing system result in receiving a request and request data associated with a user from a web server and analyzing the request data to identify one or more data gaps associated with the request. One or more third-party services are called to fill at least a portion of the one or more data gaps. A question set is prepared based on determining that the one or more data gaps remain at least partially unfilled. The question set is selected by a machine-learning component trained to adapt a sequence and content of the question set over a plurality of interactions with a plurality of users. The question set is transmitted to the web server for presentation to the user. Data exchanges can be authenticated using tokens.

22 Claims, 13 Drawing Sheets

(51) Int. Cl.
*H04L 9/40* (2022.01)
*G06F 16/958* (2019.01)
*G06F 16/9535* (2019.01)
*G06N 20/00* (2019.01)
*G06Q 30/0217* (2023.01)
*G06Q 30/0251* (2023.01)
*G06Q 30/0601* (2023.01)
*G06Q 30/0282* (2023.01)

(56) References Cited

U.S. PATENT DOCUMENTS

2020/0126126 A1* 4/2020 Briancon ............. G06K 9/6297
2021/0191926 A1* 6/2021 Izenson ................. G06N 5/041

* cited by examiner

DYNAMIC WEB CONTENT INSERTION

BACKGROUND

Websites often host a combination of content, such as stories, pictures, videos, audio clips, games, and other such content that users desire to access. Websites can also include sponsored content. Some sponsored content is interactive and seeks user input. The user input can be used to provide the user with customized offers or further content. While collecting more user inputs can result in greater personalization and/or more accurate responses to the input, the additional inputs can degrade the user experience and interfere with access to the primary content that the user intended to access. Further, interactions during data collection may increase network traffic, reducing responsiveness of a user system as more user data entry interactions occur.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

Figure 1:
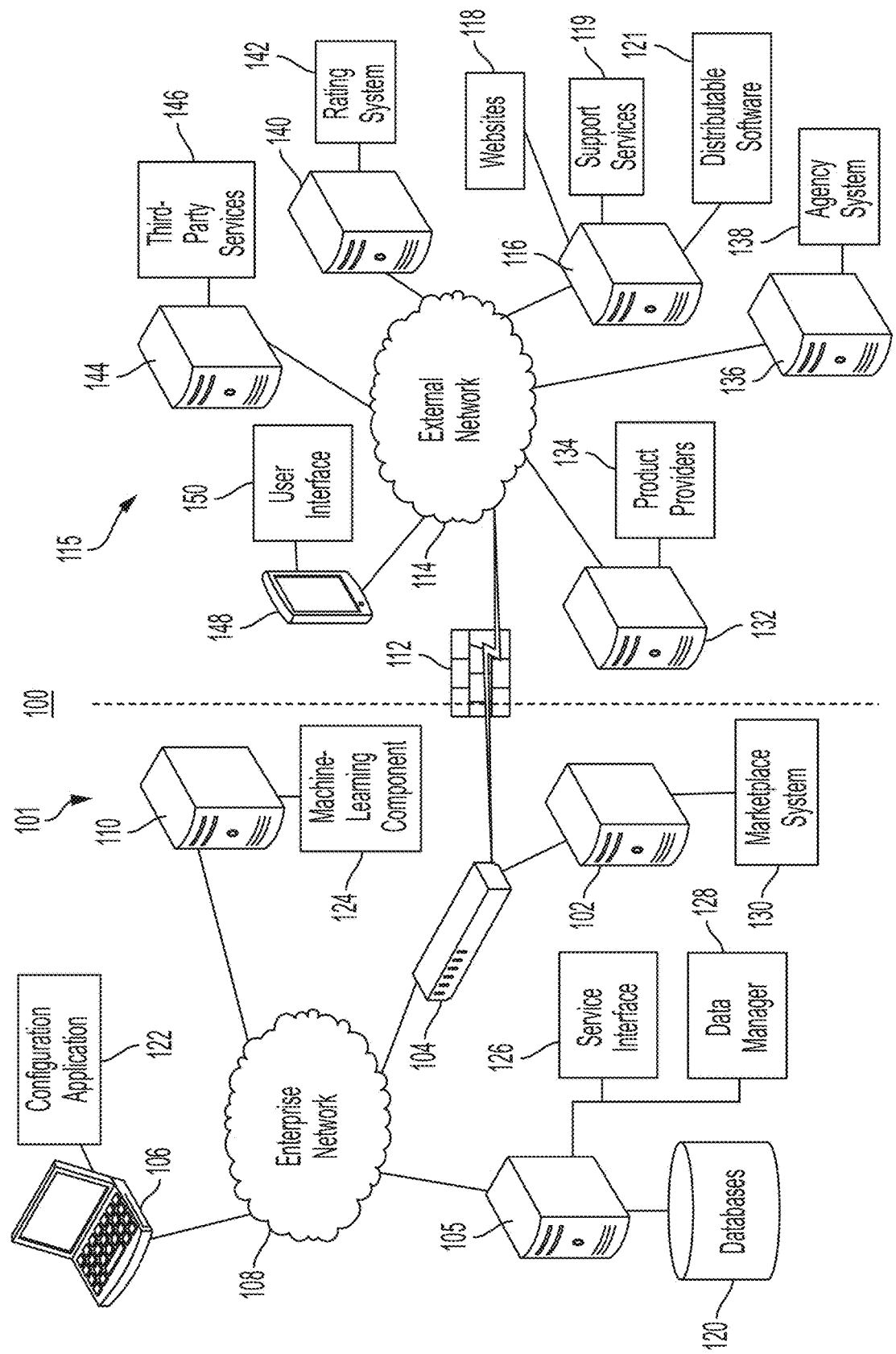
FIG. 1 depicts a block diagram of a system according to some embodiments of the present invention.

According to an embodiment, a system for dynamic web content insertion is provided. The system may be used for various practical applications, such as injecting content in a third-party website and controlling content transfer to reduce redundant data entry requests. Content injection may also occur within an application using, for example, distributable software between a user system and one or more servers while retaining user interface look-and-feel properties with the injected content. Data collection can be expedited by allowing a third-party to push data that is already known about a user to an application programming interface (API), which can then be used to determine which data fields are not already known and thus are data gaps to be populated. Requests to populate the missing data can be pushed to a user interface to collect the remaining data needed to complete a processing task. The processing task may involve requesting multiple product providers to provide a customized response based on the known data and the subsequently collected data. Rather than using static forms, dynamic data collection and display can be used to determine different approaches to data collection with respect to how data collection requests are presented and sequenced, which may be modified over time as patterns are observed. As one example, a machine-learning component can adapt questions and interaction sequences used to request data entry from users. The machine-learning component may observe which data presentation and collection sequences result in a higher completion rate or a shorter data collection interaction sequence, for example, along with other factors to optimize the user experience.

In embodiments, various technology challenges may also be addressed to simplify content injection into third-party websites and/or applications. As one example, rather than redirecting a user from a third-party website to a partner website, content can be injected into the third-party website using lightweight code or scripts. A relatively small amount of coding or scripts can be incorporated into the third-party website to make API calls to receive assets and instructions that enable functionality of an application within the third-party website or locally at a user system. The application can interpret payloads between the third-party website and/or application, and the API to apply components to the user interface as dynamically selected. An analytics script may also be available to interface between the third-party website and API to perform operations, such as tracking activity through a user interface dynamically displayed on the third-party website, and track events. Other scripts and/or code can be used to manage requests and display of data from one or more product providers to be presented on the user interface of the website and/or user application. Various security features can also be supported to authenticate sessions and secure the data exchanged between systems.

Turning now to FIG. 1, a system 100 is depicted upon which dynamic web content insertion may be implemented. The system 100 can include an enterprise network zone 101 including a marketplace server 102 coupled to a gateway 104 operable to establish communication with a data processing server 105, one or more user systems 106, one or more machine-learning systems 110, and/or other devices (not depicted) through an enterprise network 108. The gateway 104 may also establish communication to an external network 114, for example, through a firewall 112, to send and receive data to a plurality of servers and systems in an external network zone 115. The servers and systems of the external network zone 115 can include, for example, one or more web servers 116 configured to host one or more websites 118 and provide various support services 119 for dynamic content in the websites 118. The servers and systems of the external network zone 115 may also include one or more product provider servers 132 of product providers 134, an agency server 136 of an agency system 138, a rating server 140 of a rating system 142, and other third-party servers 144 that provide third-party services 146.

Multiple user systems 148 with user interfaces 150 may establish user sessions through the external network 114 with web servers 116 to interact with websites 118. Product providers 134 may establish interactions with the user systems 148 using content dynamically provided through websites 118 to the user interfaces 150. The websites 118 can include scripts or code that makes calls to other servers and systems, such as the marketplace server 102 for the marketplace system 130 to create content for display and interaction on the user interfaces 150. The web servers 116 and/or other servers and systems of the external network 114 can host distributable software 121 that supports dynamic web content insertion through one or more of the user interfaces 150. The web servers 116 may comprise any type of server or servers capable of supporting dynamically distributable content to the one or more of the user interfaces 150, e.g., an application server. The user interfaces 150 may be associated with web content viewable through a web browser or an application at the user systems 148. For example, applications executable by the user systems 148 may have software development kit (SDK) support compatible with an operating system of the user systems 148 to embed support for receiving content dynamically for display and interaction on the user interfaces 150.

As one example, to provide a user of a user system 148 with a customized offer from one or more of the product providers 134 on the user interface 150, support services 119 may include a token manager to authenticate with the marketplace system 130. The marketplace system 130 can be callable as an API. The marketplace system 130 can return a unique token that represents a user session. The user interface 150 can load a script or code associated with the marketplace system 130, consume the unique token, and share the unique token in a request to the marketplace system 130. The marketplace system 130 may interface with a service interface 126 of the data processing server 105 to track the interaction and request that a data manager 128 retrieve any known information associated with the user from databases 120 and/or other data sources. The marketplace system 130 can collect the known information and return a payload, such as a JavaScript Object Notation (JSON) payload, that can indicate known data, additional data requests to fill data collection gaps, and user experience instructions. Scripts or coding of the marketplace system 130 can render a user experience in the user interface 150 that incorporates rules, logic, styles, and other display attributes of the websites 118 on the user interface 150. Where the product providers 134 produce a customized response for a user based on a question set, the question set may be provided to the marketplace system 130 or previously stored in the databases 120. Rather than passing the full question set to the user interface 150, the marketplace system 130 and/or service interface 126 can determine which questions of the question set can be answered based on data already stored in the databases 120, which questions can be answered through third-party services 146, and which questions remain as data gaps for completion through the user interface 150.

In some embodiments, upon completing data collection, the rating system 142 can use the data collected to make rating decisions associated with the product providers 134. For example, if there are ten product providers 134 that may offer a customized product based on the data collected, the rating system 142 can interact with each of the product providers 134 or make decisions on behalf of the product providers 134. Product offers resulting from the rating system 142 associated with different product providers 134 can be displayed together on the user interface 150.

To further enhance the user experience, a machine-learning component 124 of machine-learning system 110 can observe interactions and results of user interactions, results of the rating system 142, data requests and responses of the product providers 134, targeted marketing results of the marketplace system 130, and other such factors to learn sequences, parameters, and other factors resulting in a higher success rate of users receiving quotes and selecting at least one of the quotes to pursue. The marketplace system 130 and/or service interface 126 communicate with the machine-learning component 124 to adapt a sequence and content of a question set over a plurality of interactions with a plurality of users. The machine-learning component 124 can assist in process efficiency by learning which interactions have a higher success rate and reduce processing burdens. For example, interactions with one or more of the product providers 134 may be avoided where data collected indicates a low probability of a positive response from the one or more of the product providers 134. Further, in determining a presentation order of multiple product offers, the machine-learning component 124 can suggest a display order based on factors other than cost, such as retention patterns of users having similar profiles. Data from an agency system 138 of agency server 136 may also be available to train the machine-learning component 124 as other users seek offers associated with the product providers 134 through other communication channels, such as telephone-based interactions. Once the machine-learning component 124 is trained, the agency system 138 may also use the machine-learning component 124 to suggest interaction sequences with users who choose to communicate directly with the agency system 138 rather than websites 118. The machine-learning component 124 can be periodically tuned as more interactions are observed.

User systems 106 in the enterprise network zone 101 can be configured to execute one or more configuration applications 122 to setup and maintain the service interface 126, data manager 128, databases 120, machine-learning component 124, marketplace system 130, and/or other systems or components. The user systems 106 can also be used to setup configuration and interaction rules with components of the external network zone 115.

In the example of FIG. 1, each of the marketplace server 102, data processing server 105, user systems 106, machine-learning systems 110, web servers 116, product provider servers 132, agency server 136, rating server 140, third-party servers 144, and user systems 148 can include one or more processors (e.g., a processing device, such as one or more microprocessors, one or more microcontrollers, one or more digital signal processors) that receive instructions (e.g., from memory or like device), execute those instructions, and perform one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100. Although depicted separately, one or more of the marketplace server 102, data processing server 105, machine-learning systems 110, web servers 116, product provider servers 132, agency server 136, rating server 140, and third-party servers 144 can be combined or further subdivided.

The user systems 106, 148 may each be implemented using a computer executing one or more computer programs for carrying out processes described herein. In one embodiment, the user systems 106, 148 may each comprise a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 148 are operated by users seeking information on websites 118 with marketplace system 130 providing enhancements to the websites 118 to present customized offers on behalf of the product providers 134. It will be understood that there may be multiple user systems 106, 148 configured to interact with elements of the system 100.

Each of the marketplace server 102, data processing server 105, user systems 106, machine-learning systems 110, web servers 116, product provider servers 132, agency server 136, rating server 140, third-party servers 144, and user systems 148 can include a local data storage device, such as a memory device. A memory device, also referred to herein as "computer-readable memory" (e.g., non-transitory memory devices, as opposed to transmission devices or media), may generally store program instructions, code, and/or modules that, when executed by a processing device, cause a particular machine to function in accordance with one or more embodiments described herein.

Figure 2:
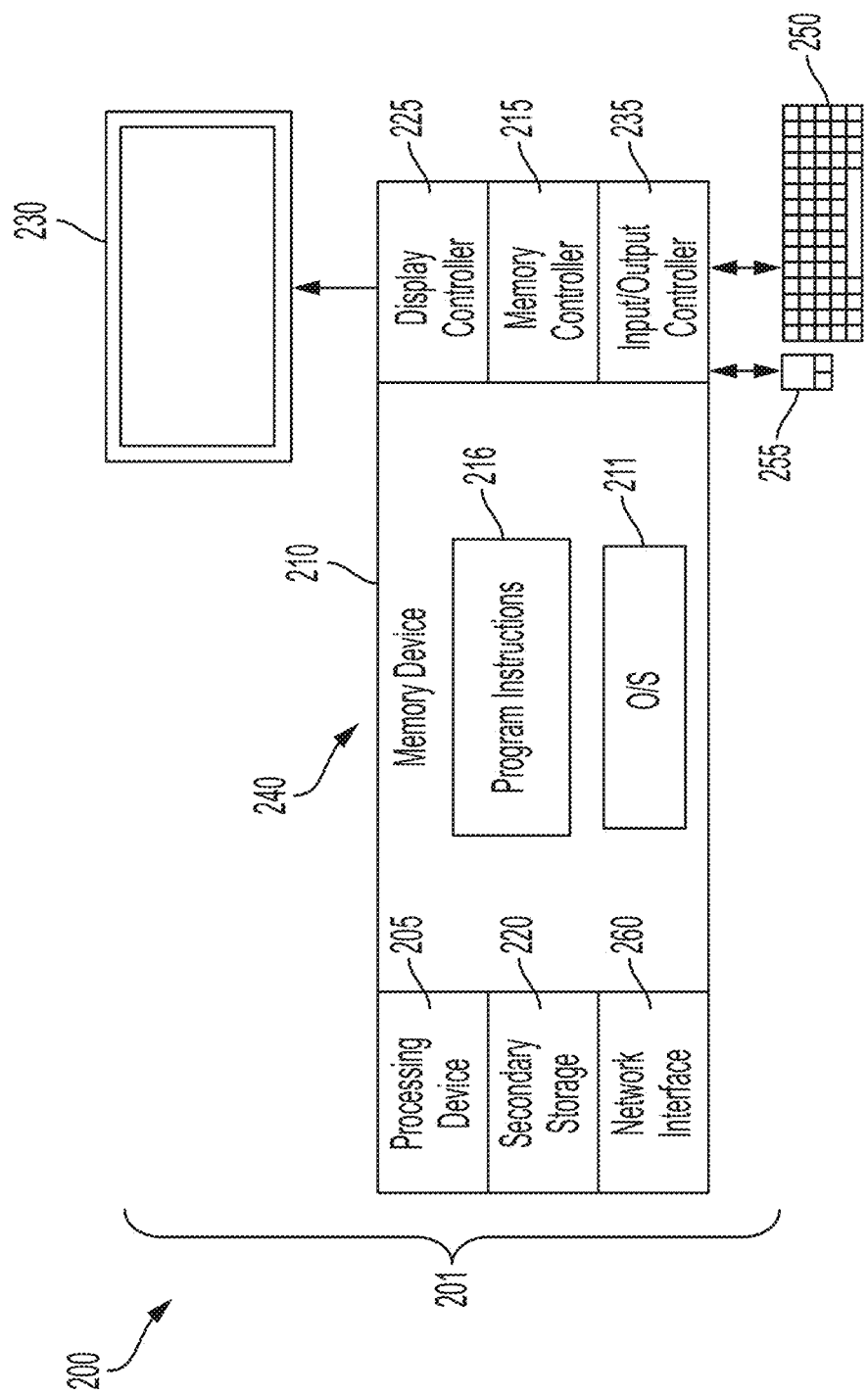
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the marketplace server 102, data processing server 105, user systems 106, machine-learning systems 110, web servers 116, product provider servers 132, agency server 136, rating server 140, third-party servers 144, and user systems 148 of FIG. 1.

In an exemplary embodiment, in terms of hardware architecture, as shown in FIG. 2, the computer 201 includes a processing device 205 of a processing system and a memory device 210 of a memory system coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the configuration application 122, machine-learning component 124, service interface 126, data manager 128, marketplace system 130, websites 118, support services 119, product providers 134, agency system 138, rating system 142, third-party services 146, and/or other programmable components of the system 100 of FIG. 1.

The computer 201 of FIG. 2 also includes a network interface 260 that can establish communication channels with one or more other computer systems via one or more network links. The network interface 260 can support wired and/or wireless communication protocols known in the art, for example to establish communication with the enterprise network 108 and the external network 114 of FIG. 1.

Figure 3:
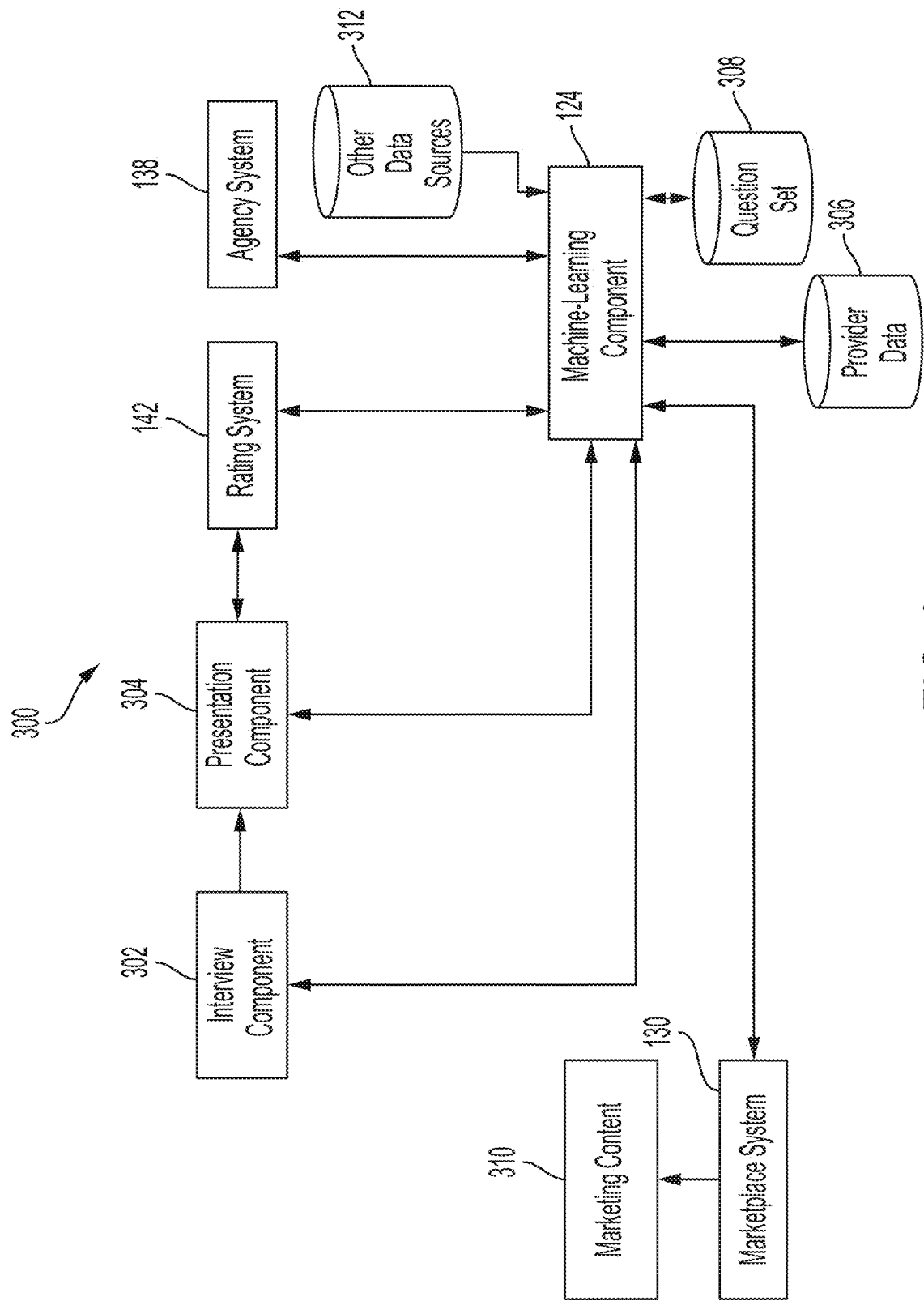
FIG. 3 depicts a block diagram of machine-learning component interactions according to some embodiments of the present invention.

FIG. 3 depicts a block diagram of machine-learning component interactions 300 according to some embodiments. In the example of FIG. 3, an interview component 302 interfaces with a presentation component 304 and the machine-learning component 124. The interview component 302 can comprise a distributable widget interfaced with one or more of the websites 118 of FIG. 1 supporting data entry through user interface 150 of FIG. 1. The presentation component 304 can comprise another distributable widget interfaced with websites 118 to display results on user interface 150 from the rating system 142 based on data collected through the interview component 302 and other data sources. The machine-learning component 124 can access a question set 308 and provider data 306 associated with the product providers 134 of FIG. 1 to customize the question selection and presentation as part of an interview process. The machine-learning component 124 can select an order of questions from the question set 308 and may eliminate some questions or expand the questions to cover additional products. User experience can be customized by selecting between various types of input interfaces, such as pulldown lists, radio buttons, checkboxes, free-form text, voice-enabled data entry, natural language interfaces, and the like. Initial configurations can be established based on preferences of operators of the websites 118. The machine-learning component 124 can modify the user experience in presenting options in the presentation component 304. For example, the order of presenting offers can be modified to promote offers that have had a higher rate of acceptance based on learned patterns. Geographic region, household size, credit rating, driving data, billing, retention, coverage level, engagement, and other such factors may be observed by the machine-learning component 124 to adjust result ordering and display attributes in the presentation component 304. The machine-learning component 124 can access supplemental data from other data sources 312 to enhance the available knowledgebase for analysis and population by the machine-learning component 124. The other data sources 312 can be provided, for example, through the third-party services 146 of FIG. 1 and/or other servers/systems. Data can be collected and updated in real-time as interactions are observed. The machine-learning component 124 may also include reasoning results in the material to be displayed by the presentation component 304 as to why a provider and offer combination was selected for display. As the machine-learning component 124 observes results, the provider data 306 and/or question set 308 can be updated. The provider data 306 and/or question set 308 can be stored, for example, in databases 120 of FIG. 1 or elsewhere within the system 100 of FIG. 1.

The agency system 138 can also provide a data source for the machine-learning component 124. For example, billing, policies, quote results, retention, losses, engagement sequences, and other such data can be made available to enhance the training data available for the machine-learning component 124. Further, the agency system 138 may also use suggestions provided by the machine-learning component 124 in determining how to interact with other users. In some embodiments, the presentation component 304 can customize both a user and agent experience depending on usage patterns of users at user systems 148 of FIG. 1 and/or agents interacting through the agency system 138. The machine-learning component 124 can interact with the marketplace system 130 to assist in targeting users visiting websites 118 of FIG. 1 and producing marketing content 310 for insertion in the websites 118. The marketing content 310 can include marketing material targeting users based on previous marketing activities that were deemed to have a higher probability of success by the machine-learning component 124. The machine-learning component 124 establishes a feedback loop and can collectively consider multiple aspects beyond direct user data entry to enhance marketing, interview, and presentation aspects that align user needs with preferences of the product providers 134 and operators of websites 118. Content presented through user interface 150 in interview component 302, presentation component 304, and marketing content 310 are examples of dynamically generated content that can be inserted into websites 118 and/or distributable software 121.

Figure 4:
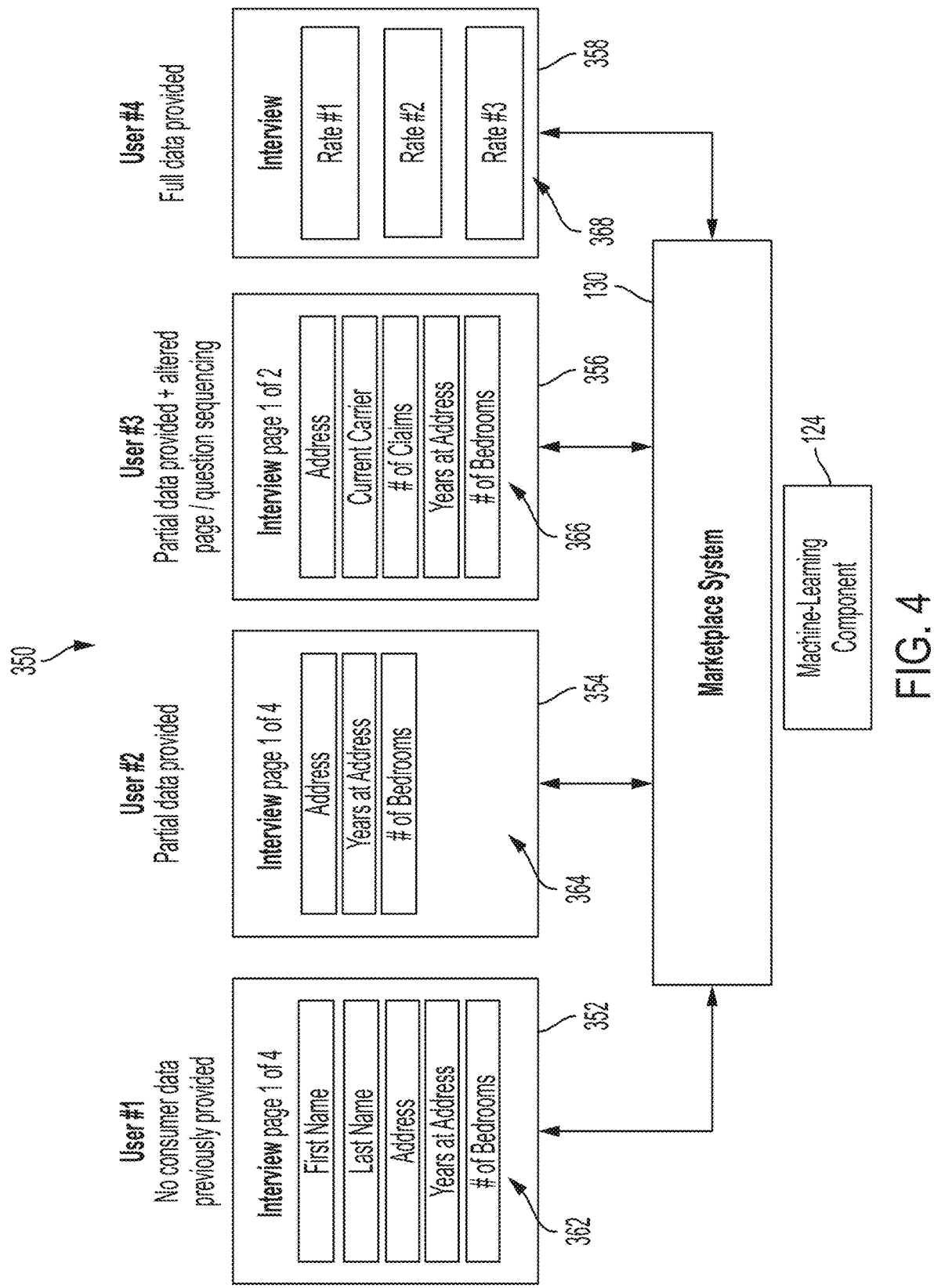
FIG. 4 depicts an example of different interview interactions depending on data availability and question sequencing according to some embodiments of the present invention.

FIG. 4 depicts an example of different interview interactions 350 depending on data availability and question sequencing according to embodiments. The interview interactions 350 illustrate how users may have different experiences through the interview component 302 of FIG. 3 based on various factors. For example, an interview experience of a first user interacting with the marketplace system 130 can be determined as supported by the machine-learning component 124 to be an interview sequence 352 spanning multiple pages on the presentation component 304 of FIG. 3 with question sequence 362 deemed a preferred order where no consumer data was previously provided. An interview experience of a second user can differ from that of the first user, where partial data is provided, resulting in an interview sequence 354 spanning multiple pages on the presentation component 304 of FIG. 3 with question sequence 364. As an example, a first and last name of the user may already be known before presenting the interview sequence 354, and thus first name and last name questions can be omitted from the question sequence 364. An interview experience of a third user may differ based on partial data availability and scoring performed by the machine-learning component 124 indicating that a different page or questioning sequence is preferred for the third user. For example, the interview sequence 356 for the third user may only span two pages versus four pages of interview sequences 352 and 354. Further, a question sequence 366 of the interview sequence 356 may be determined to present questions about a current carrier/provider and a number of claims after collecting address information but before asking for a number of years at the current address and number of bedrooms in a dwelling at the address. Where all data is available for a user, such as a fourth user, an interview sequence 358 can involve presenting a selected order of rate quotes with a question sequence 368 defining which of the rate quotes should appear first, second, and third (e.g., in a top-to-bottom ordering). It will be understood that the interview interactions 350 of FIG. 4 are merely examples, and there can be many variations (e.g., thousands) as different amounts of user data is available and as the machine-learning component 124 continues to learn and refine question selection and sequencing.

Figure 5:
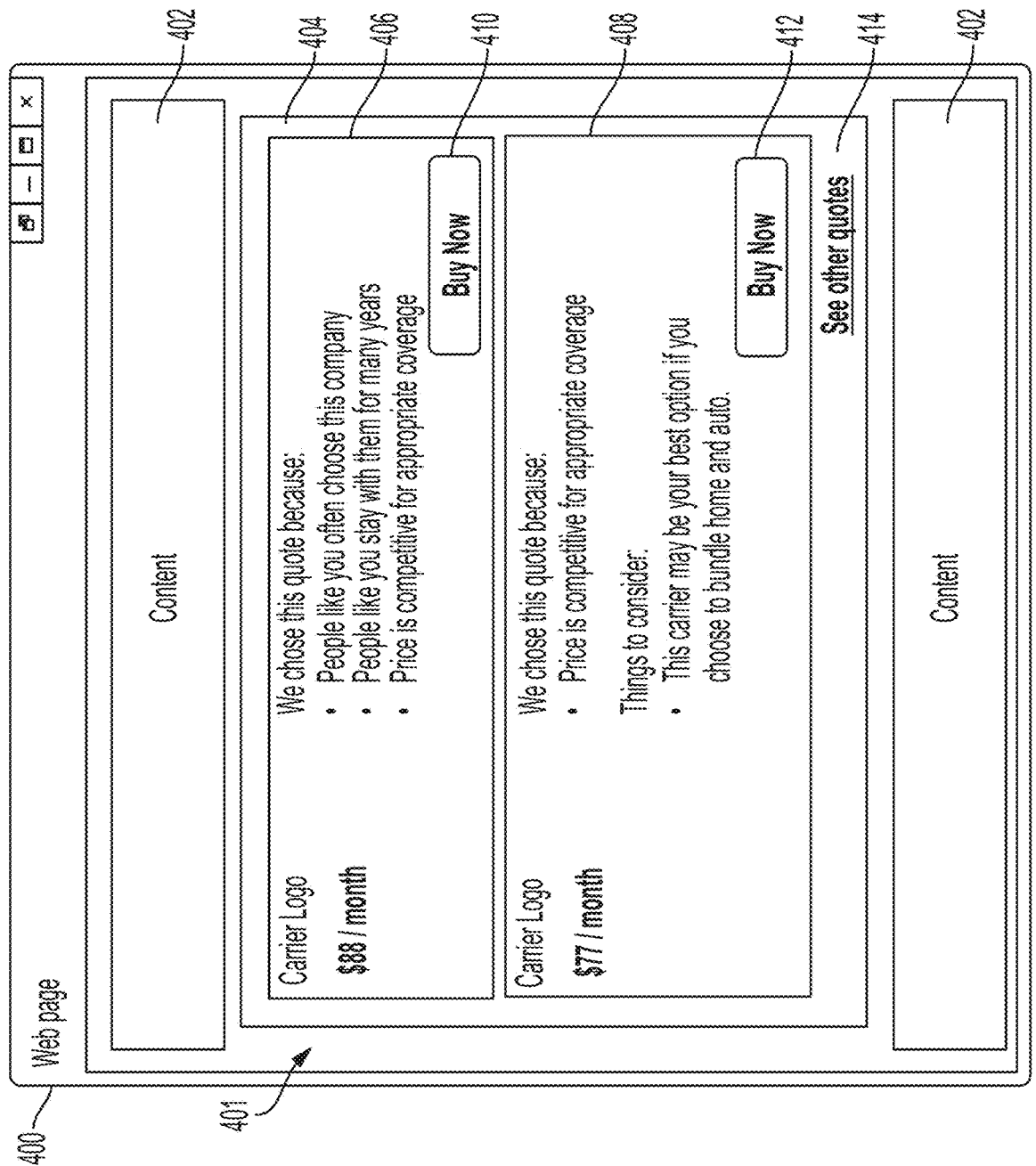
FIG. 5 depicts an example of dynamically generated content according to some embodiments of the present invention.

FIG. 5 depicts an example of dynamically generated content 401 on a web page 400 according to embodiments. The web page 400 is an example web page that can be part of the websites 118. The web page 400 can include content 402 that is primary content that a user may seek to engage. For example, content 402 may be a story, an automotive review, a technology article, a homebuying article, a health article, or other such material. The marketing content 310 of FIG. 3 may have encouraged a user to engage with the interview component 302 of FIG. 3 to seek one or more offers from product providers 134 of FIG. 1. In the example of FIG. 5, the product providers 134 include multiple insurance carriers. A widget 404 can display results of presentation component 304 of FIG. 3, such as a first offer 406 and a second offer 408. Customizations of the offers 406 and 408 can include explanations as to why the first offer 406 and the second offer 408 were selected, such as the machine-learning component 124 of FIG. 1 recognizing similar characteristics between the user and other customers, long-term retention data, pricing, product bundling options, and other such factors. In the example of FIG. 5, the machine-learning component 124 may rank the first offer 406 higher than the second offer 408 based on multiple factors, even though the second offer 408 may have a lower cost than the first offer 406. The first offer 406 may have a product purchasing option 410 targeting one of the product providers 134, and the second offer 408 may have a product purchasing option 412 targeting a different one of the product providers 134. Upon selecting the product purchasing option 410 of the first offer 406 or the product purchasing option 412 of the second offer 408, further order completion information may be provided in the widget 404 while preventing navigation away from the web page 400. Alternatively, selecting the product purchasing option 410 or product purchasing option 412 can launch a new window in a web browser session that passes session information to a completion website specific to the corresponding product provider 134. The widget 404 may include other selectable options, such as a link to see other offers or quotes 414 that were returned from the rating system 142 but were identified as having a lower preference score by the machine-learning component 124. As selections are made, the resulting selections can also be provided to the machine-learning component 124 of FIG. 1 as a further source of training data.

Figure 6:
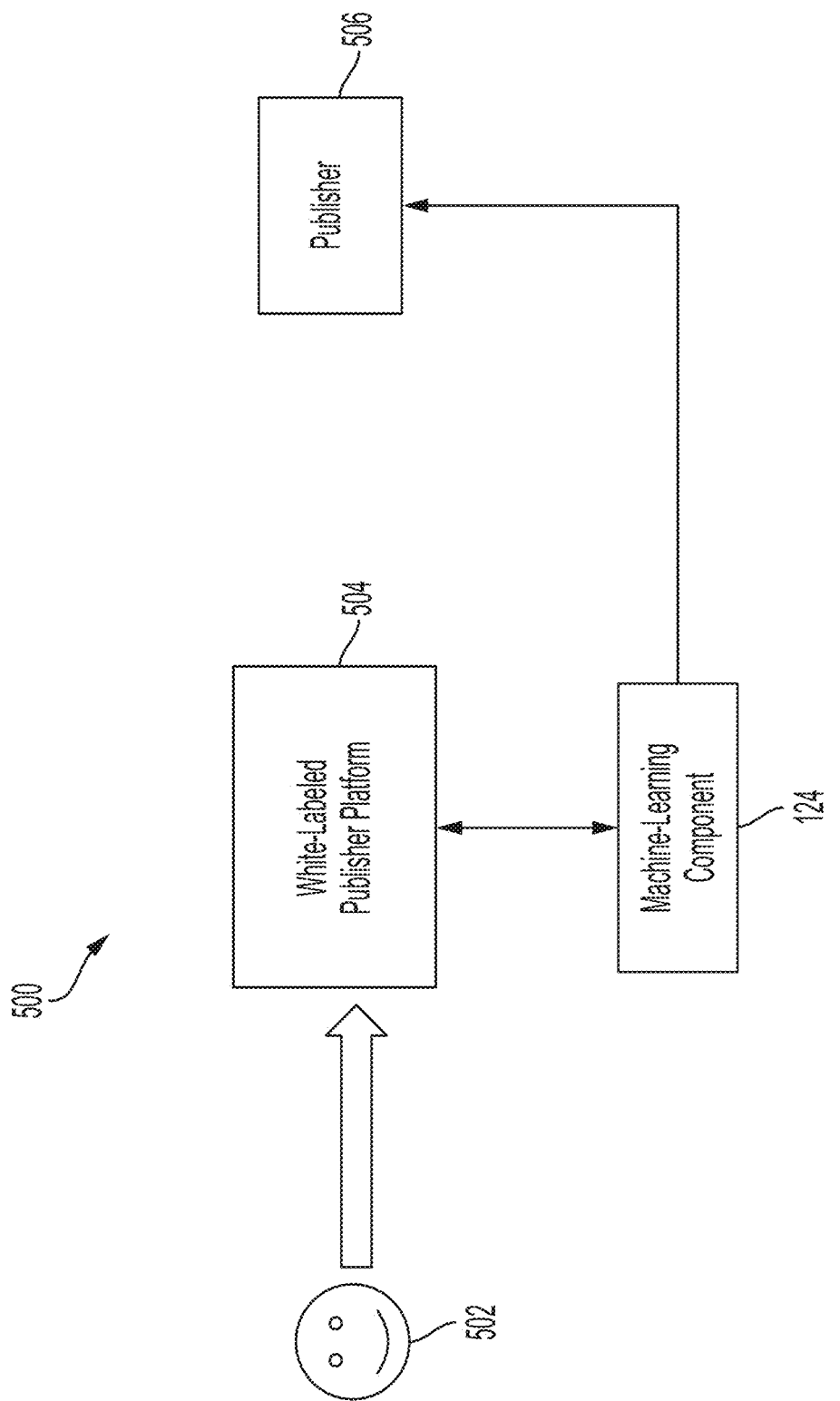
FIG. 6 depicts a block diagram of a publisher model according to some embodiments of the present invention.

FIG. 6 depicts a block diagram of a publisher model 500 according to embodiments. The publisher model 500 can support various transaction types with respect to users 502, a white-labeled publisher platform 504, the machine-learning component 124 and a publisher 506. The publisher 506 can be a party controlling the web server 116 providing the websites 118 seeking to promote the product providers 134 of FIG. 1 or another party involved in seeking engagement of the user 502 through the user interface 150 of FIG. 1. The white-labeled publisher platform 504 can include a simplified interface and application that is customized for the user 502 based on details provided by the machine-learning component 124, such as preferred content and formatting to present to the user 502 based on learned patterns. Rather than the publisher 506 generating revenue from the product providers 134 using a cost-per-click or cost-per-acquisition model, revenue generation can be in the form of the expected value of a lead. In such a scenario, the machine-learning component 124 can also compute economic factors to predict a probability of conversion and an expected lifetime value of revenue for the user 502 to accept the offer of one of the product providers 134 being promoted by the publisher 506 within the websites 118. For example, the machine-learning component 124 may estimate a long-term value of the user 502 accepting an offer and determine a fair market value for a quote/click to be paid to the publisher 506. Other revenue models can be used that leverage the predictions provided by the machine-learning component 124 and result in a transfer of funding upon quote completion or offer acceptance/product purchase as recommended to the user 502. In some embodiments, the machine-learning component 124 can use look-alike modeling to identify similar characteristics from available data make predictions or fill in gaps in available data associated with the user 502, for instance, based on similarities in location and/or other such factors.

Figure 7:
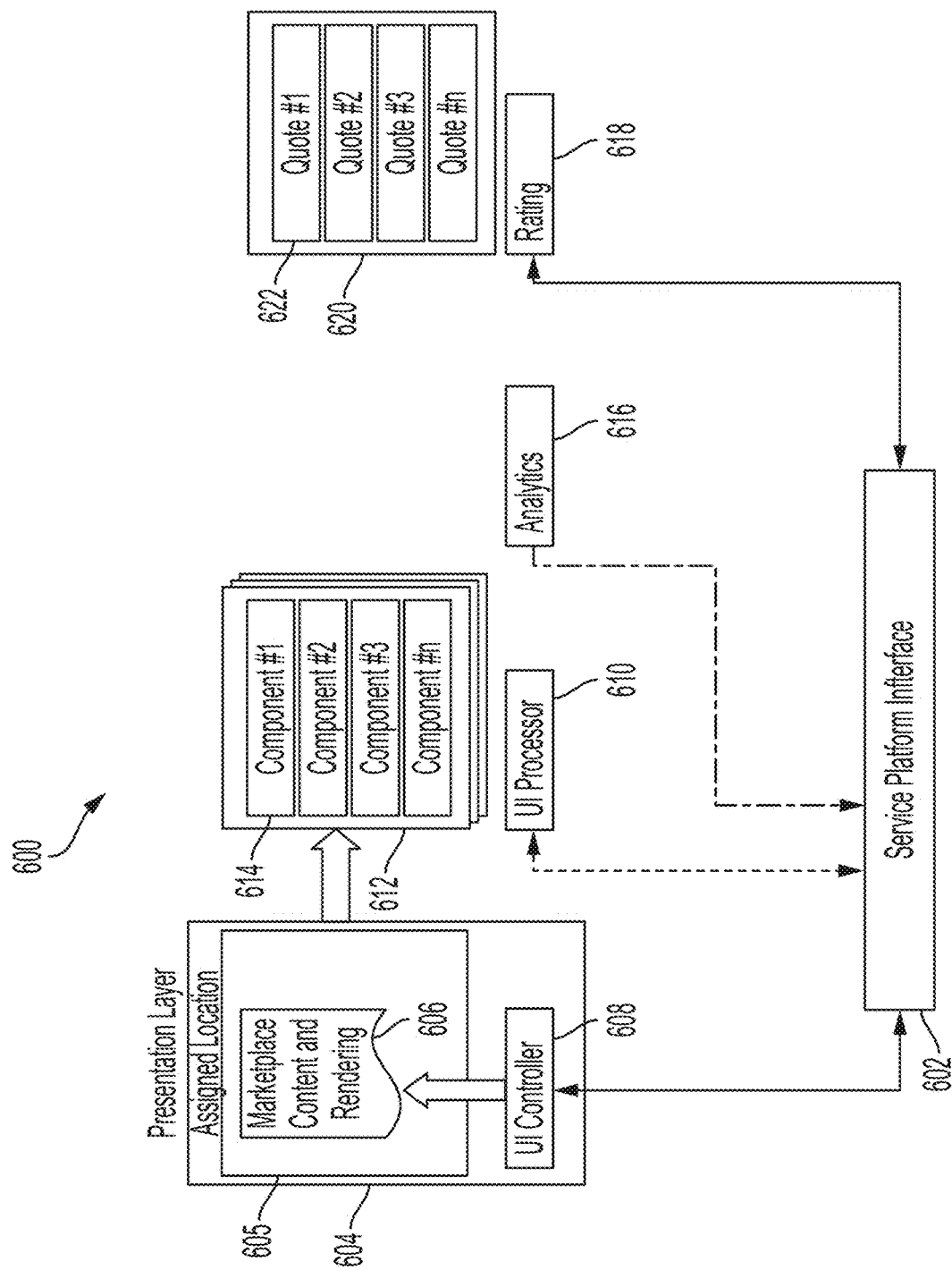
FIG. 7 depicts a block diagram of web server interactions with a service platform interface according to some embodiments of the present invention.

FIG. 7 depicts a block diagram of web server interactions 600 with a service platform interface 602 according to some embodiments. The service platform interface 602 can be part of the service interface 126 of FIG. 1 that supports the marketplace system 130 of FIG. 1, websites 118 of FIG. 1, and user interface 150 of FIG. 1. In the example of FIG. 7, a presentation layer 604, such as a web page or application, can include a dynamic portion 605 with content 606 (e.g., marketplace content and rendering) that is populated at an assigned location based on a user interface controller 608 to support dynamic content injection from the service platform interface 602. The content 606 can include assets and instructions from the service platform interface 602 to support interfacing with the marketplace system 130. The content 606 can include hypertext markup language, scripts, methods, controllers, executable code, images, videos, audio sources, and various workflow payloads. A user interface processor script 610 can interpret workflow payloads from the service platform interface 602 for display on one or more user interfaces 612 as components 614. The user interfaces 612 can replace/update content 606 in the dynamic portion 605 of the presentation layer 604 with components 614, for example, as part of interview component 302 of FIG. 3. An analytics script 616 can communicate with the service platform interface 602 to track activity in the user interfaces 612 and store events in an analytics database, which may be part of the databases 120 of FIG. 1. A ratings script 618 can communicate with the service platform interface 602 and include logic associated with requesting and presenting rates in user interface 620 as quotes 622. User interface 620 can be the presentation component 304 of FIG. 3, which can replace/update the user interfaces 612 in the dynamic portion 605 of the presentation layer 604. The scripts or code used to implement the user interface controller 608, user interface processor script 610, analytics script 616, and ratings script 618 can be part of the support services 119 of FIG. 1 or deployed to the user interface 150 of FIG. 1 to be executed and establish communication with the service platform interface 602. It will be understood that additional support scripts may be used to manage processing and result generation beyond those depicted in the example of FIG. 7. Scripts can be embedded at runtime based on software libraries and/or software development kits (SDKs) for one or more software development languages compatible with the user systems 148 of FIG. 1.

Figure 8:
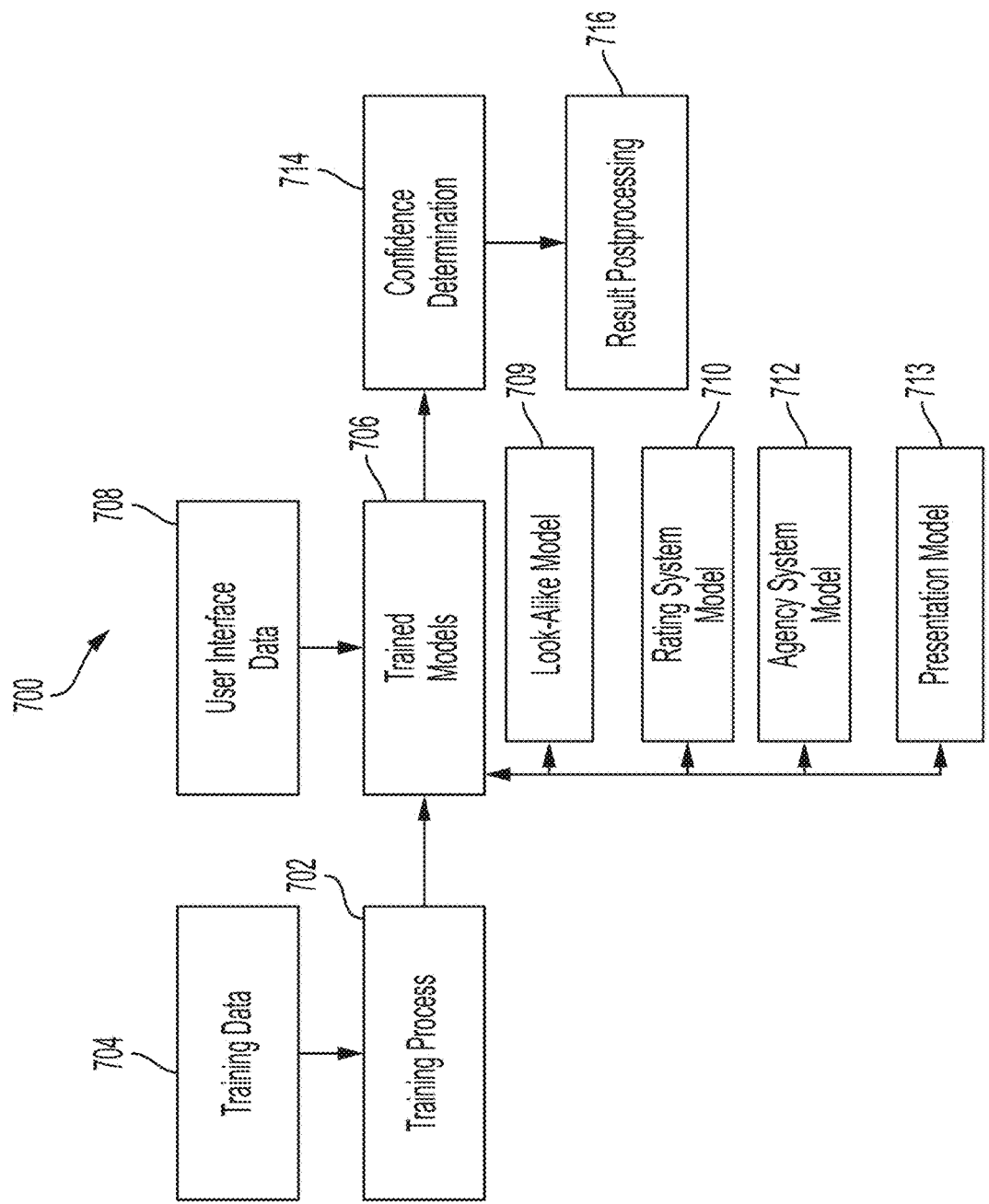
FIG. 8 depicts a machine-learning component training and usage process according to some embodiments of the present invention.

FIG. 8 depicts a machine-learning component training and usage process 700 according to some embodiments. The machine-learning component training and usage process 700 can include a training process 702 that analyzes training data 704 to develop trained models 706 as part of the machine-learning component 124 of FIG. 1. The training process 702 can use labeled or unlabeled data in the training data 704 to learn features, such as data needed for the rating system 142 of FIG. 1, presentation sequences, question selection for the question set 308 of FIG. 3, contributions of the agency system 138 of FIG. 1, results of marketing content 310 of FIG. 3, provider preferences from provider data 306 of FIG. 3, and other such features. The training data 704 can include a set of training data to establish a ground truth for learning coefficients/weights and other such features known in the art of machine learning to develop trained models 706. The trained models 706 can include a family of models to identify specific types of features of interest. For example, the trained models 706 can include a look-alike model 709, a rating system model 710, an agency system model 712, and a presentation model 713. Other such models and further subdivision of the trained models 706 can be incorporated in various embodiments.

The look-alike model 709 can learn associations between values of data sets to support filling data gaps with "best guess" values when the details are not directly available. For example, the look-alike model 709 can group user data based on geography, neighborhoods, and/or other such groupings using previously collected data and/or publicly available data. For instance, data may be available for the age of dwelling construction in a neighborhood, sales prices within the neighborhood, loss events due to storm damage within the neighborhood, median income, personal property tax records, previous quotes and quote outcomes provided within a localized geographic area, and/or other such data values. The look-alike model 709 may provide confidence values based on the number of data values and relative age of the data values, which can be used to determine whether look-alike values should be used to fill in data gaps or avoid asking questions where the confidence values are greater than a minimum confidence threshold.

The rating system model 710 can identify, for example, characteristics of product providers 134 of FIG. 1 able to provide a rate or not provide a rate, referral generation, declined referrals, report selection with reconciliation to results, additional or alternate products available, access to data from third-party services 146, and other such information along with supporting reasons. The agency system model 712 can identify, for example, which of the product providers 134 of FIG. 1 did not close transactions, commissions, losses, retention, operational costs, and other such information along with supporting reasons. The presentation model 713 can determine a preferred order and content of questions in the question set 308 of FIG. 3 to be presented through the presentation component 304 of FIG. 3. Further, the presentation model 713 can determine presentation parameters for displaying components 614 and/or quotes 622 of FIG. 7.

User interface data 708 gathered from the user interface 150 of FIG. 1 can be fed to the trained models 706 to track and predict a number of factors that lead to a confidence determination 714. For example, the trained models 706 may consider factors, such as a marketing tactic or content used to engage with a user, resources used to attract the user, questions and results of user interactions, products requested by the user, time of engagement with the user, quotes presented to the user, user navigation patterns, quote selection, alterations after selection, engagement transition of the user to/from the agency system 138 of FIG. 1, point of process abandonment by the user, type of payment, other third-party data, and other such factors. As various factors are weighted and combined, the confidence determination 714 can select most likely outcomes and/or preferred sequencing of material presentation. The results of the confidence determination 714 can be further conditioned by result postprocessing 716. The result postprocessing 716 can cross-compare results of the confidence determination 714 to make a final determination to support dynamic content generation and other aspects. The result postprocessing 716 can pass processing results along with related values to other components of the system 100 of FIG. 1, such as the service interface 126, marketplace system 130, websites 118, user interface 150, and/or other components. Results of interactions can provide feedback to enhance learning and continue training over time. In some embodiments, feedback can be collected for a period of time or a minimum retraining threshold before triggering an update in one or more of the look-alike model 709, rating system model 710, agency system model 712, and presentation model 713. Thus, the machine-learning component 124 of FIG. 1 can incorporate a collection of learning machines that work together using the trained models 706 to determine multiple aspects of question selection and presentation format/content to enhance user experiences while also seeking to improve outcomes for the product providers 134 of FIG. 1.

Figure 9:
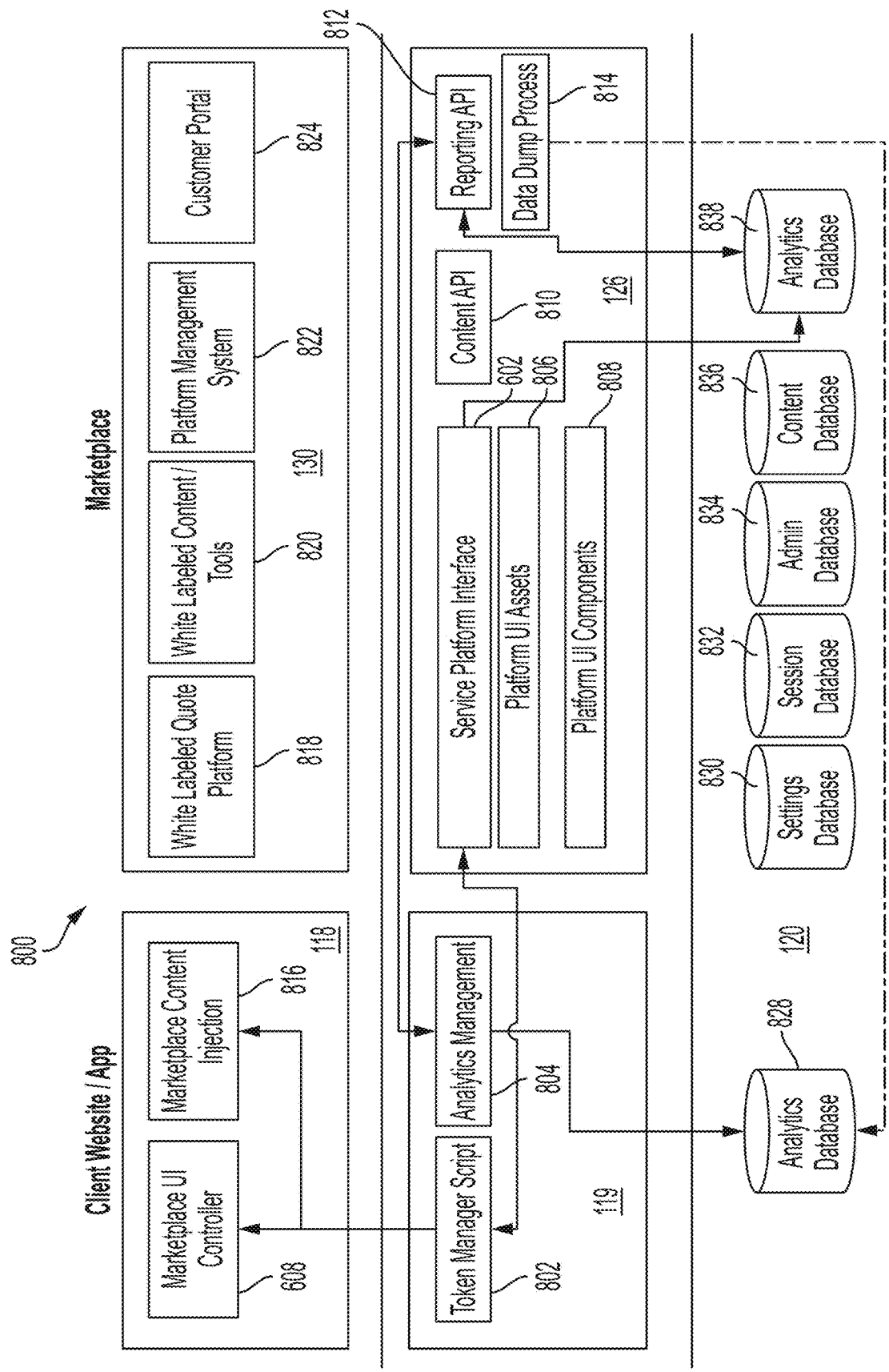
FIG. 9 depicts a block diagram of a cross-platform architecture according to some embodiments of the present invention.

FIG. 9 depicts a block diagram of a cross-platform architecture 800 according to some embodiments. In the example of FIG. 9, support services 119 can include a token manager script 802, analytics management 804, and other support components. The service interface 126 can include the service platform interface 602, platform user interface assets 806, platform user interface components 808, a content API 810, a reporting API 812, a data dump process 814, and other support components. Website 118 and/or distributable software 121 of FIG. 1 can include user interface controller 608, content injection 816, and other support components. Marketplace system 130 can include a white-labeled quote platform 818, white-labeled content/tools 820, platform management system 822, customer portal 824, and other support components. The analytics management 804 and data dump process 814 can interface with one or more databases 120, such as an externally accessible analytics database 828. The databases 120 can also include, for example, a settings database 830, a session database 832, an administrative database 834, a content database 836, and an internally accessible analytics database 838.

According to an embodiment, the token manager script 802 can make a request to the service platform interface 602 inclusive of any data available for a user to prepare a product offer, such as a quote for purchase. The service platform interface 602 can capture the request data and determine experience elements needed to return a product offer including additional data needed beyond the data provided with the request. The service platform interface 602 can call third-party services 146 to fill in as many gaps in the data as possible. The service platform interface 602 may interact with the machine-learning component 124 of FIG. 1 to determine how to formulate an interaction sequence for content injection 816 in populating data gaps. The machine-learning component 124 may recommend which platform user interface assets 806 and platform user interface components 808 should be used for content injection 816 through the content API 810. If it is determined that the data gaps can be filled without asking direct questions of the user, then the interview component 302 of FIG. 3 can be bypassed and the rating system 142 can be called to get a rating result. If data gaps still exist, the machine-learning component 124 can select one or more questions from question set 308 of FIG. 3 and determine a user experience for display on website 118 and/or through distributable software 121. The user interface controller 608 can use the token associated with the user session and other credentials to establish a session with the service platform interface 602, and the content API 810 can return data and scripts to support user experience rendering through the content injection 816.

The white-labeled quote platform 818 can provide basic templates for white-labeled content/tools 820 to be further customized by the content API 810. In embodiments, the look-and-feel of injected content can be set to align with the environment of the website 118 and/or distributable software 121. For example, a font, background color, and other display parameters can be applied to the dynamically inserted content to make the content less intrusive with respect to other existing content displayed on the website 118. The platform management system 822 can be used to make updates to templates used to support the white-labeled quote platform 818 and/or white-labeled content/tools 820, for example, through configuration application 122 of FIG. 1. The customer portal 824 can allow product providers 134 of FIG. 1 and/or an operator of website 118 to access features and setup preferences within the marketplace system 130. Preferences may be stored in the settings database 830. User progress through the interview component 302 of FIG. 3 and results of presentation component 304 of FIG. 3 can be tracked by the reporting API 812, with internal analytics results being written to the internally accessible analytics database 838 by the reporting API 812 or the service platform interface 602. When an error occurs or a user prematurely terminates a session, a data dump process 814 may capture the results in the externally accessible analytics database 828 which can also be available for analytics management 804 and reporting API 812.

Where third-party services 146 are used in supporting data population, cost estimates, property data, marketing lead data, and other such sources that may change over time, the data sources or services can be monitored for changes to ensure that modeling and decision logic use the correct/latest versions of the data. To the extent that the changes impact rules, decisions, or machine-learning data, the changes may trigger an update to the machine-learning component 124 where the training data 704 of FIG. 8 may be updated to refine the trained models 706 of FIG. 8. Further, changes may impact how the service platform interface 602 accesses the third-party services 146 to fill in data gaps.

It will be understood that the cross-platform architecture 800 can include additional elements (not depicted) to support dynamic web content insertion beyond those depicted in FIG. 9. Further, elements of FIG. 9 can be shifted between systems, further subdivided or combined.

Figure 10:
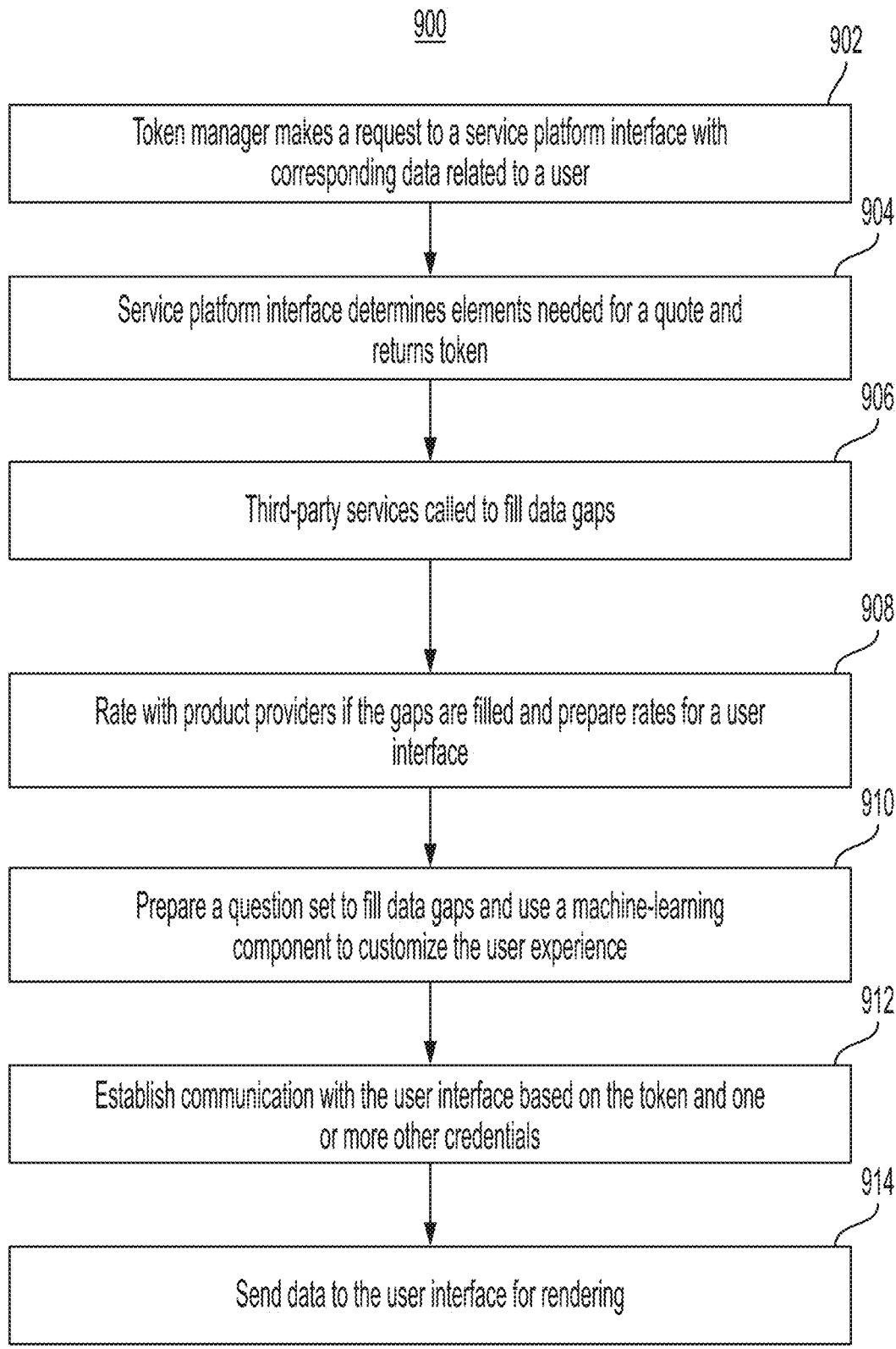
FIG. 10 depicts a process flow according to some embodiments of the present invention.

FIG. 10 depicts a process flow 900 for dynamic web content insertion according to some embodiments. The process flow 900 includes a number of steps that may be performed in the depicted sequence or in an alternate sequence. The process flow 900 may be performed by the system 100 of FIG. 1. In one embodiment, the process flow 900 is performed by the data processing server 105 of FIG. 1 in combination with other servers and systems. The process flow 900 is described in reference to FIGS. 1-10.

At step 902, a token manager 802 can make a request to a service platform interface 602, such as a quoting platform API, with corresponding data related to a user. At step 904, the service platform interface 602 can determine elements needed for an offer or quote and return the token. At step 906, one or more third-party services 146 can be called to fill one or more data gaps, where data gaps are detected and not otherwise filled through the look-alike model 709 of FIG. 8. At step 908, the rating system 142 can be called to compute a rate for one or more product provider 134 if the data gaps are filled and rates can be prepared for the user interface 150. The rating system model 710 can be used to determine data and parameters to be sent to the rating system 142 and capture results of decisions made by the rating system 142. At step 910, a question set 308 can be prepared to fill data gaps and use the machine-learning component 124 to customize the user experience. At step 912, communication with the user interface 150 can be established based on the token and one or more other credentials. At step 914, data can be sent to the user interface 150 for rendering as dynamic web content insertion into a website 118 and/or distributable software 121.

Figure 11:
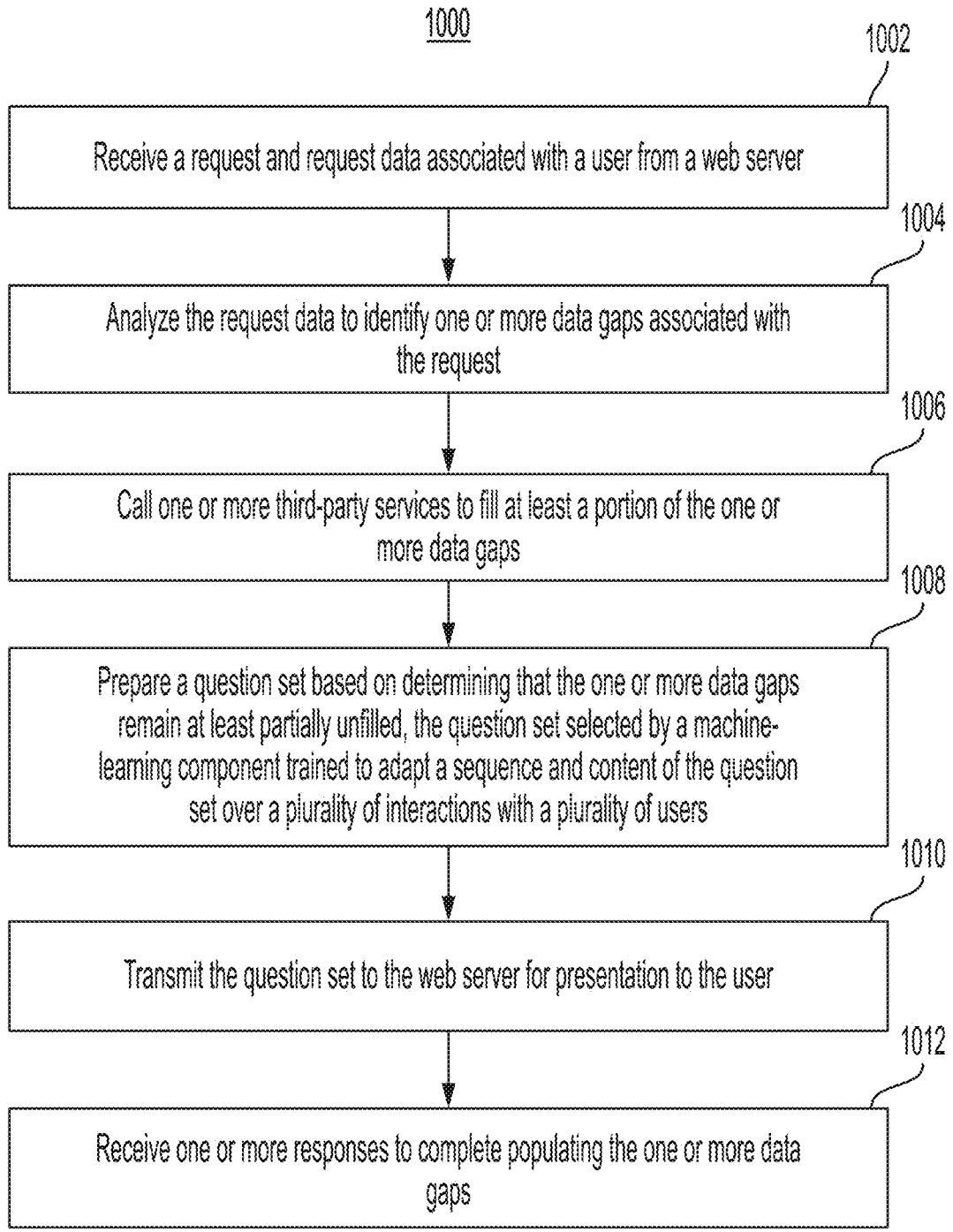
FIG. 11 depicts a process flow according to some embodiments of the present invention.

Turning now to FIG. 11, a process flow 1000 for dynamic web content insertion is depicted according to an embodiment. The process flow 1000 includes a number of steps that may be performed in the depicted sequence or in an alternate sequence. The process flow 1000 may be performed by the system 100 of FIG. 1. In one embodiment, the process flow 1000 is performed by the data processing server 105 of FIG. 1 in combination with the marketplace server 102, the one or more user systems 106, and/or the one or more machine-learning systems 110. The process flow 1000 is described in reference to FIGS. 1-11.

At step 1002, a service platform interface 602 can receive a request and request data associated with a user from the web server 116. The request can be based on user interactions with a web page or application through a user interface 150. A token associated with a session of the user can also be received by the service platform interface 602. An exchange of data can be authenticated based on the token.

At step 1004, the service platform interface 602 can analyze the request data to identify one or more data gaps associated with the request. At step 1006, the service platform interface 602 can call one or more third-party services 146 to fill at least a portion of the one or more data gaps, for example, where the data gaps are not filled through the look-alike model 709. At step 1008, the service platform interface 602 can prepare a question set 308 based on determining that the one or more data gaps remain at least partially unfilled. The question set can be selected by a machine-learning component 124 trained to adapt a sequence and content of the question set 308 over a plurality of interactions with a plurality of users.

At step 1010, the service platform interface 602 can transmit the question set 308 to the web server 116 for presentation to the user. The service platform interface 602 can return the token to the web server 116 with the question set 308. The service platform interface 602 can providing user interface content based on the token. At step 1012, the service platform interface 602 can receive one or more responses to complete populating the one or more data gaps.

In some embodiments, a completed data set associated with a request can be transmitted to a rating system 142 associated with a plurality of product providers 134. One or more product offers can be received from the rating system 142 based on the completed data set, and the one or more product offers can be transmitted to the web server 116. A product offer selection result can be received based on the one or more product offers transmitted to the web server 116, and the machine-learning component 124 can be updated based on the product offer selection result and the one or more product offers. An indication of a decline to quote message may be received from the rating system 142 along with other associated data. One or more parameters associated with the decline to quote message can be tracked by the machine-learning component 124. Other request and response parameters can also be tracked to enhance the rating system model 710.

In some embodiments, a targeted marketing plan can be determined by the machine-learning component 124, such as identifying characteristics of users for content injection based on a topic of the websites 118 or other such factors. The look-alike model 709 may be used in developing the targeted marketing plan, for example, to identify users having similar characteristics. Content, such as content 606, can be provided to the web server 116 based on the targeted marketing plan.

In some embodiments, a web page can be provided to a user by the web server 116, where the web page includes one or more embedded interfaces to access an application programming interface configured to insert the question set 308 into the web page. Alternatively, insertion of the question set 308 can be performed through an application supporting the one or more embedded interfaces. The one or more embedded interfaces can include one or more scripts/code configured to interpret a plurality of payloads from the application programming interface and apply one or more components to process one or more user interface interactions. Interfacing with a marketplace system 130 can render an experience embedded within a user interface 150 to apply one or more rules, styles, and templates for display content of the web page. Feedback from the marketplace system 130 can be received to assist the machine-learning component 124 to adapt the sequence and content of the question set 308.

Figure 12:
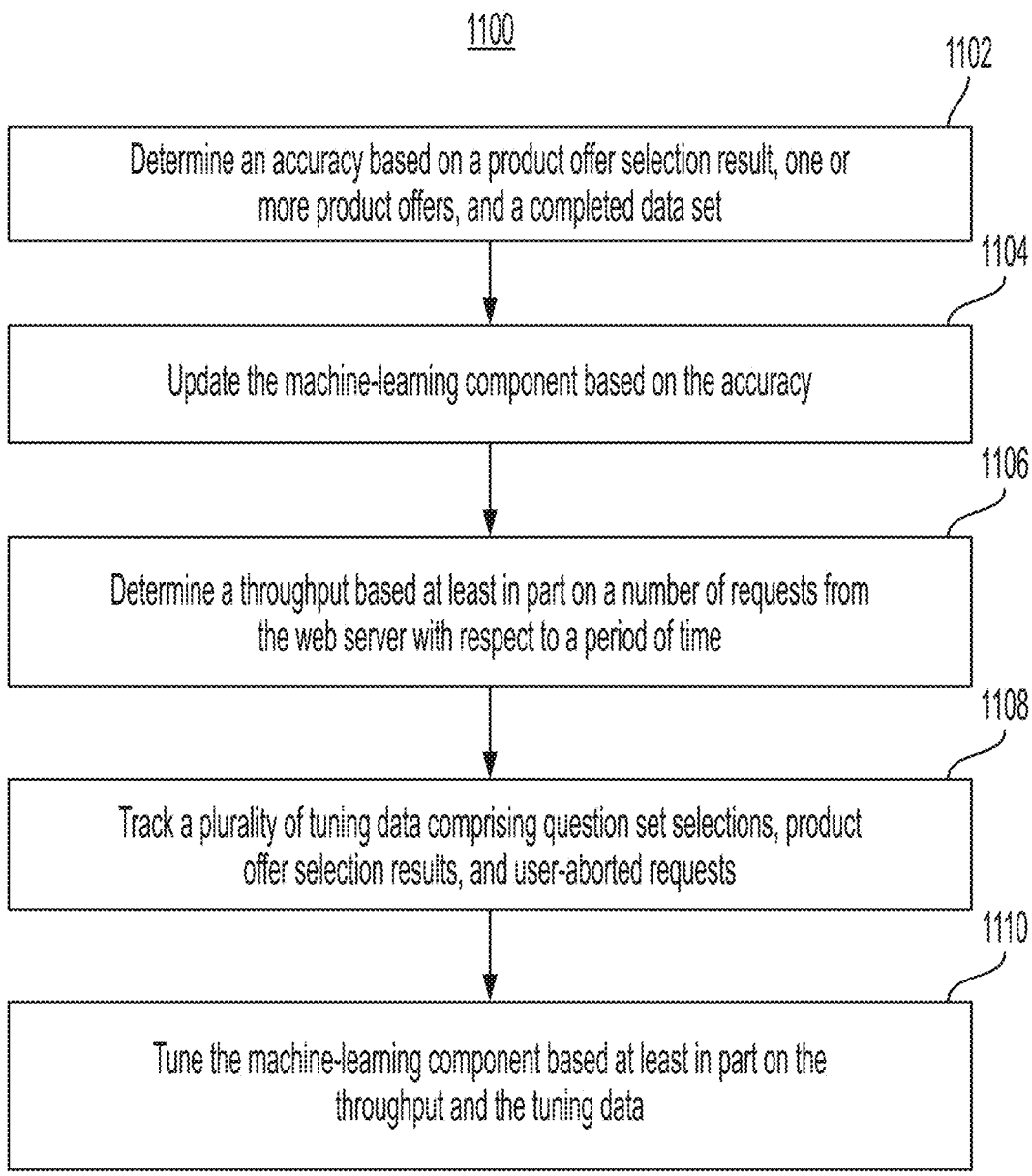
FIG. 12 depicts a process flow according to some embodiments of the present invention.
Figure 13:
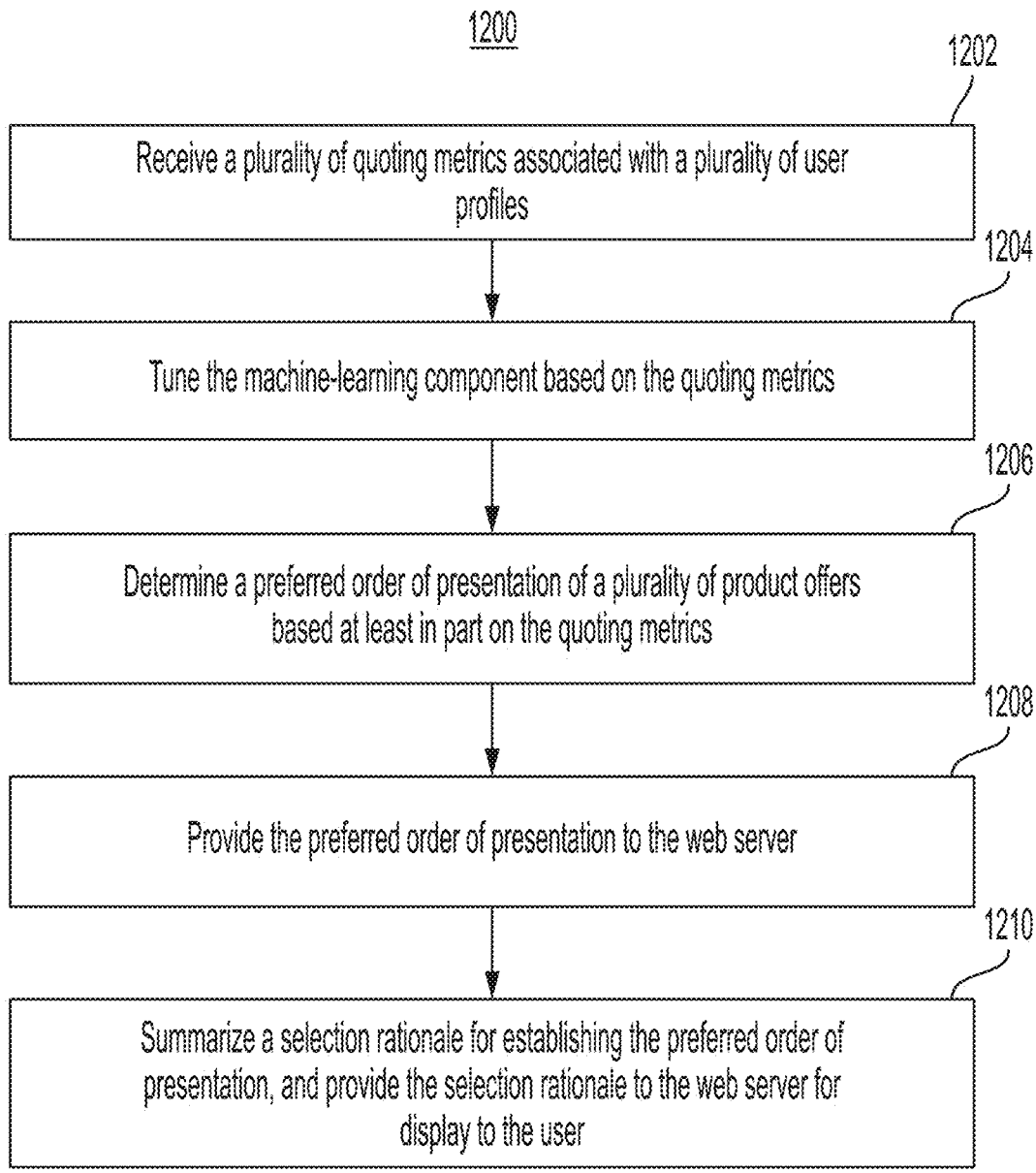
FIG. 13 depicts a process flow according to some embodiments of the present invention.

Process flow 1000 can be further enhanced to include one or more steps of process 1100 of FIG. 12 and/or process 1200 of FIG. 13. Although processes 1100 and 1200 are illustrated as sequential flows, various steps of processes 1100 and 1200 can be selectively performed, omitted, or combined in embodiments. Further, steps of processes 1100 and 1200 can be incorporated within the process flow 1000 of FIG. 11 or performed separately.

In reference to process 1100, at step 1102, an accuracy can be determined based on a product offer selection result, one or more product offers, and a completed data set. At step 1104, the machine-learning component 124 can be updated based on the accuracy. At step 1106, a throughput can be determined based at least in part on a number of requests from the web server 116 with respect to a period of time. At step 1108, a plurality of tuning data can be tracked that includes question set selections, product offer selection results, and user-aborted requests. The tuning data may also include collection of post-acquisition data. For instance, where the product is an insurance policy, the post-acquisition data may include claim/loss data, payment data, coverage modification data, renewal data, and other such data. At step 1110, the machine-learning component 124 can be tuned based at least in part on the throughput and the tuning data. Tuning of the machine-learning component 124 can include a partial retraining of one or more of the trained models 706.

The process flow 1200 of FIG. 13 can begin at step 1202, where a plurality of quoting metrics associated with a plurality of user profiles can be received. At step 1204, the machine-learning component 124 can be tuned based on the quoting metrics. At step 1206, a preferred order of presentation of a plurality of product offers can be determined based at least in part on the quoting metrics. At step 1208, the preferred order of presentation can be provided to the web server 116. At step 1210, a selection rationale for establishing the preferred order of presentation can be summarized, and the selection rationale can be provided to the web server 116 for display to the user on user interface 150. The presentation model 713 can be accessed to determine presentation ordering and to learn which order of presentation results in greater user engagement.

Technical effects include using existing data from various sources to reduce the amount of user system interactions in data collection. Further, machine learning is applied to select the data presented to a user (e.g., type of questions) and user experiences to improve user experience in data entry. The selection can customize the number of questions, sequence of questions, and formatting to reduce data collection time and data exchange with respect to a user system. Presenting data that has been automatically customized by the machine-learning component can be based on performance data to continue refining sequences that reduce data entry processing loads locally at user systems. Resulting product offers can also be customized to highlight offers that are determined more likely to be appealing to the user based on multiple factors. Efficient interactions can reduce user system engagement time while having a higher conversion rate. Managing interactions and offers across multiple providers at the same time can reduce the number of individual interactions and redundant data requests.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
    a network interface configured to communicate with a web server and one or more third-party services;
    a processing system in communication with the network interface; and
    a memory system in communication with the processing system, the memory system storing instructions that when executed by the processing system result in:
        receiving a request and request data associated with a user from the web server;
        receiving a token associated with a session of the user;
        authenticating an exchange of data based on the token;
        analyzing the request data to identify one or more data gaps associated with the request;
        calling the one or more third-party services to fill at least a portion of the one or more data gaps;
        preparing a question set based on determining that the one or more data gaps remain at least partially unfilled, the question set selected by a machine-learning component trained to adapt a sequence and content of the question set over a plurality of interactions with a plurality of users;
        transmitting the question set to the web server for presentation to the user and returning the token to the web server with the question set;
        providing user interface content based on the token; and
        receiving one or more responses to complete populating the one or more data gaps.

2. The system of claim 1, further comprising instructions that when executed by the processing system result in:
    transmitting a completed data set associated with the request to a rating system associated with a plurality of product providers;
    receiving one or more product offers from the rating system based on the completed data set; and
    transmitting the one or more product offers to the web server.

3. The system of claim 2, further comprising instructions that when executed by the processing system result in:
    receiving a product offer selection result based on the one or more product offers transmitted to the web server; and
    updating the machine-learning component based on the product offer selection result and the one or more product offers.

4. The system of claim 3, further comprising instructions that when executed by the processing system result in:
    determining an accuracy based on the product offer selection result, the one or more product offers, and the completed data set; and
    updating the machine-learning component based on the accuracy.

5. The system of claim 4, further comprising instructions that when executed by the processing system result in:
    determining a throughput based at least in part on a number of requests from the web server with respect to a period of time;
    tracking a plurality of tuning data comprising question set selections, product offer selection results, and user-aborted requests; and
    tuning the machine-learning component based at least in part on the throughput and the tuning data.

6. The system of claim 2, further comprising instructions that when executed by the processing system result in:
    receiving an indication of a decline to quote message from the rating system; and
    tracking one or more parameters associated with the decline to quote message by the machine-learning component.

7. The system of claim 1, further comprising instructions that when executed by the processing system result in:
    receiving a plurality of quoting metrics associated with a plurality of user profiles; and
    tuning the machine-learning component based on the quoting metrics.

8. The system of claim 7, further comprising instructions that when executed by the processing system result in:
    determining a preferred order of presentation of a plurality of product offers based at least in part on the quoting metrics; and
    providing the preferred order of presentation to the web server.

9. The system of claim 8, further comprising instructions that when executed by the processing system result in:
    summarizing a selection rationale for establishing the preferred order of presentation; and
    providing the selection rationale to the web server for display to the user.

10. The system of claim 1, further comprising instructions that when executed by the processing system result in:

determining a targeted marketing plan by the machine-learning component; and providing content to the web server based on the targeted marketing plan.

11. The system of claim 1, wherein a web page provided to the user by the web server comprises one or more embedded interfaces to access an application programming interface configured to insert the question set into the web page.

12. The system of claim 11, wherein the one or more embedded interfaces comprise one or more scripts configured to interpret a plurality of payloads from the application programming interface and apply one or more components to process one or more user interface interactions.

13. The system of claim 11, further comprising instructions that when executed by the processing system result in:
    interfacing with a marketplace system configured to render an experience embedded within a user interface to apply one or more rules, styles, and templates for display content of the web page; and
    receiving feedback from the marketplace system to assist the machine-learning component to adapt the sequence and content of the question set.

14. A computer program product comprising a storage medium embodied with computer program instructions that when executed by a computer cause the computer to implement:
    receiving a request and request data associated with a user from a web server;
    receiving a token associated with a session of the user;
    authenticating an exchange of data based on the token;
    analyzing the request data to identify one or more data gaps associated with the request;
    calling one or more third-party services to fill at least a portion of the one or more data gaps;
    preparing a question set based on determining that the one or more data gaps remain at least partially unfilled, the question set selected by a machine-learning component trained to adapt a sequence and content of the question set over a plurality of interactions with a plurality of users;
    transmitting the question set to the web server for presentation to the user and returning the token to the web server with the question set;
    providing user interface content based on the token; and
    receiving one or more responses to complete populating the one or more data gaps.

15. The computer program product of claim 14, further comprising computer program instructions that when executed by the computer cause the computer to implement:
    transmitting a completed data set associated with the request to a rating system associated with a plurality of product providers;
    receiving one or more product offers from the rating system based on the completed data set; and
    transmitting the one or more product offers to the web server.

16. The computer program product of claim 15, further comprising computer program instructions that when executed by the computer cause the computer to implement:
    receiving a product offer selection result based on the one or more product offers transmitted to the web server; and
    updating the machine-learning component based on the product offer selection result and the one or more product offers.

17. The computer program product of claim 16, further comprising computer program instructions that when executed by the computer cause the computer to implement:
    determining an accuracy based on the product offer selection result, the one or more product offers, and the completed data set; and
    updating the machine-learning component based on the accuracy.

18. The computer program product of claim 17, further comprising computer program instructions that when executed by the computer cause the computer to implement:
    determining a throughput based at least in part on a number of requests from the web server with respect to a period of time;
    tracking a plurality of tuning data comprising question set selections, product offer selection results, and user-aborted requests; and
    tuning the machine-learning component based at least in part on the throughput and the tuning data.

19. The computer program product of claim 15, further comprising computer program instructions that when executed by the computer cause the computer to implement:
    receiving an indication of a decline to quote message from the rating system; and
    tracking one or more parameters associated with the decline to quote message by the machine-learning component.

20. The computer program product of claim 14, further comprising computer program instructions that when executed by the computer cause the computer to implement:
    receiving a plurality of quoting metrics associated with a plurality of user profiles;
    tuning the machine-learning component based on the quoting metrics;
    determining a preferred order of presentation of a plurality of product offers based at least in part on the quoting metrics;
    providing the preferred order of presentation to the web server;
    summarizing a selection rationale for establishing the preferred order of presentation; and
    providing the selection rationale to the web server for display to the user.

21. The computer program product of claim 14, further comprising computer program instructions that when executed by the computer cause the computer to implement:
    determining a targeted marketing plan by the machine-learning component; and
    providing content to the web server based on the targeted marketing plan.

22. The computer program product of claim 14, wherein a web page provided to the user by the web server comprises one or more embedded interfaces to access an application programming interface configured to insert the question set into the web page, the one or more embedded interfaces comprise one or more scripts configured to interpret a plurality of payloads from the application programming interface and apply one or more components to process one or more user interface interactions, and further comprising computer program instructions that when executed by the computer cause the computer to implement:
    interfacing with a marketplace system configured to render an experience embedded within a user interface to apply one or more rules, styles, and templates for display content of the web page; and receiving feedback from the marketplace system to assist the machine-learning component to adapt the sequence and content of the question set.

\* \* \* \* \*